(12) United States Patent
Bandiwdekar

(10) Patent No.: US 10,824,760 B2
(45) Date of Patent: *Nov. 3, 2020

(54) METHOD FOR SAVING, SENDING AND RECOLLECTION OF CONFIDENTIAL USER DATA

(71) Applicant: Akshay Santosh Bandiwdekar, San Francisco, CA (US)

(72) Inventor: Akshay Santosh Bandiwdekar, San Francisco, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 16/229,279

(22) Filed: Dec. 21, 2018

(65) Prior Publication Data

US 2019/0114446 A1  Apr. 18, 2019

Related U.S. Application Data

(63) Continuation of application No. 15/427,051, filed on Feb. 8, 2017, now Pat. No. 10,198,596.

(60) Provisional application No. 62/292,362, filed on Feb. 8, 2016.

(51) Int. Cl.
*G06F 21/62* (2013.01)

(52) U.S. Cl.
CPC ...... *G06F 21/6245* (2013.01); *G06F 21/6254* (2013.01)

(58) Field of Classification Search
CPC .......... G06F 21/31; G06F 21/36; G06F 21/46; G06F 21/6245–6254; G06F 2221/2131; H04L 9/3226; H04L 63/08; H04L 63/083
See application file for complete search history.

(56) References Cited

U.S. PATENT DOCUMENTS

| | | | | |
|---|---|---|---|---|
| 2008/0214298 A1* | 9/2008 | Byng | .................... | G07F 17/323 463/29 |
| 2014/0289870 A1* | 9/2014 | Selander | ................. | G06F 21/46 726/28 |
| 2016/0065559 A1* | 3/2016 | Archer | .................. | H04L 63/083 726/8 |

* cited by examiner

*Primary Examiner* — Kevin Bechtel
(74) *Attorney, Agent, or Firm* — Aslan Law, P.C.

(57) ABSTRACT

A method and/or system receiving original confidential or sensitive user personal identifiable information data, displaying a number of empty character boxes or spaces, receiving data representing a first number of empty character boxes or spaces selected to correspond to a first cluster of empty character boxes or spaces, allocating a second number of empty character boxes or spaces corresponding to a second cluster of empty character boxes or spaces, and replacing at least one of said first cluster of empty character boxes or spaces or said second cluster of empty character boxes or spaces with a human recognizable and human readable visual cue such as a hand drawn scribble, hand drawn drawing, doodle or glyph, text in a second language or script, a photograph or a camera taken picture, or voice or sound recording.

15 Claims, 10 Drawing Sheets

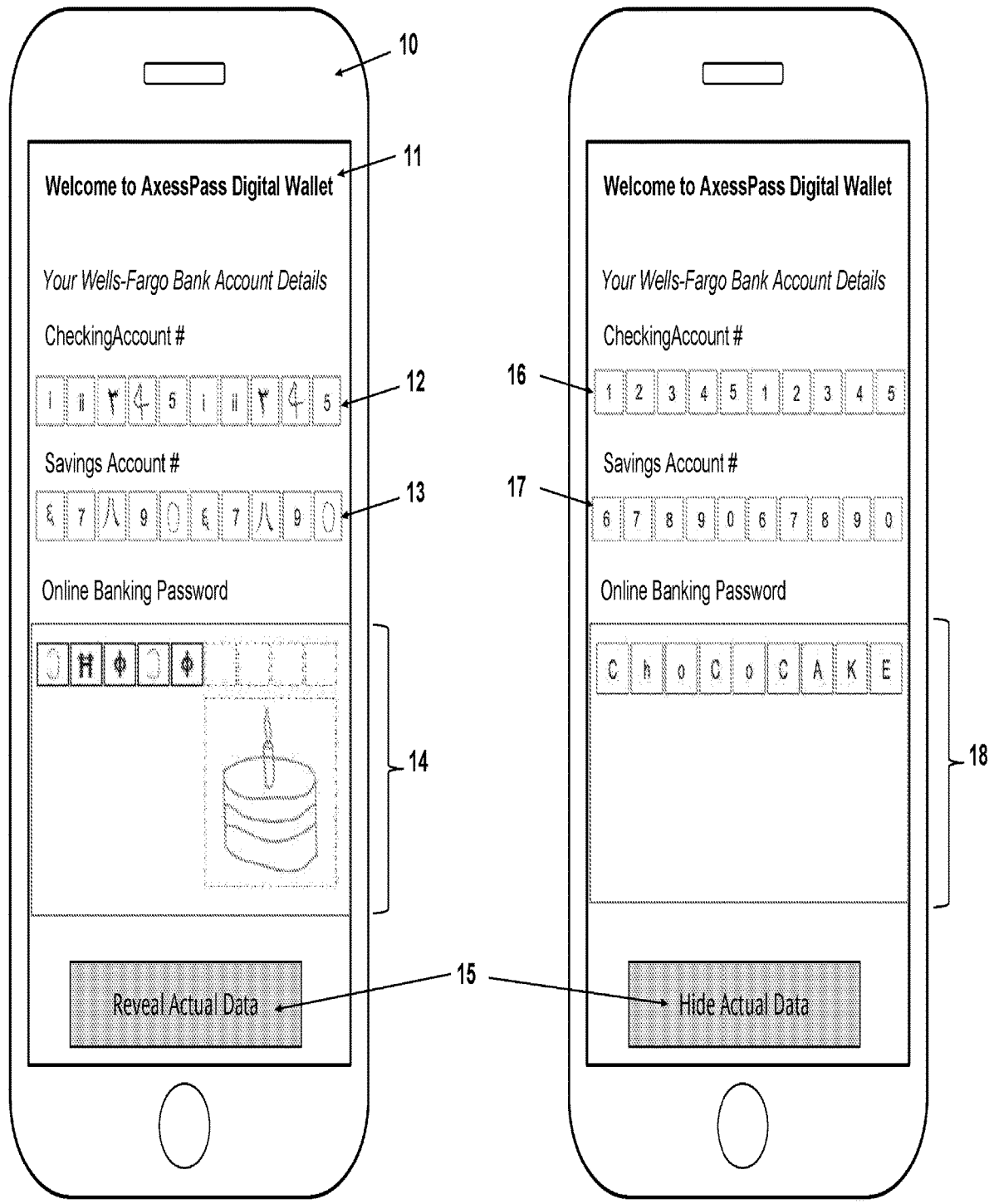
FIG. 1 shows an example embodiment of a smartphone App that may implement one or more methods of this disclosure FIG. 2 shows an example embodiment of one of the ways to edit and save PII data through a smartphone app
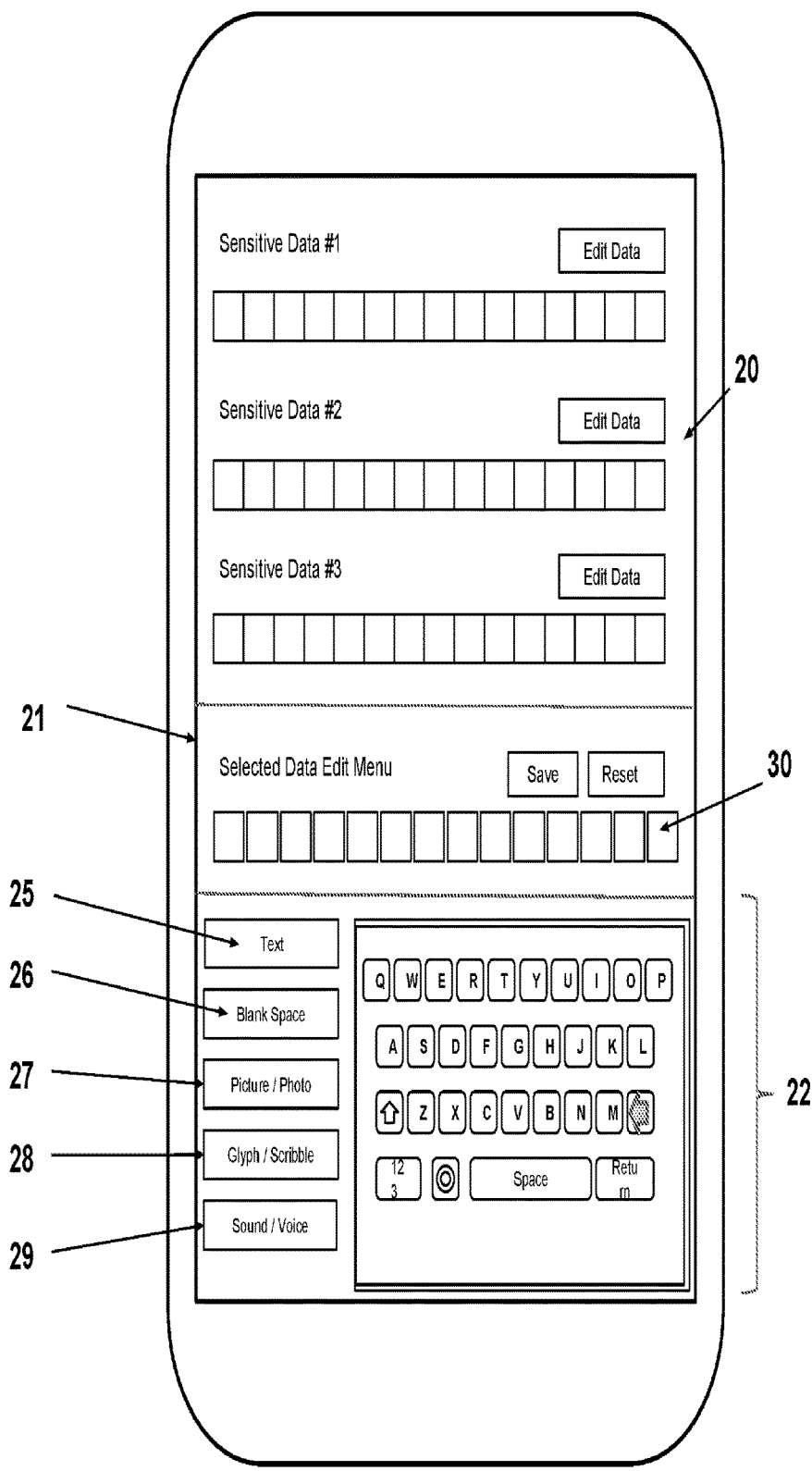

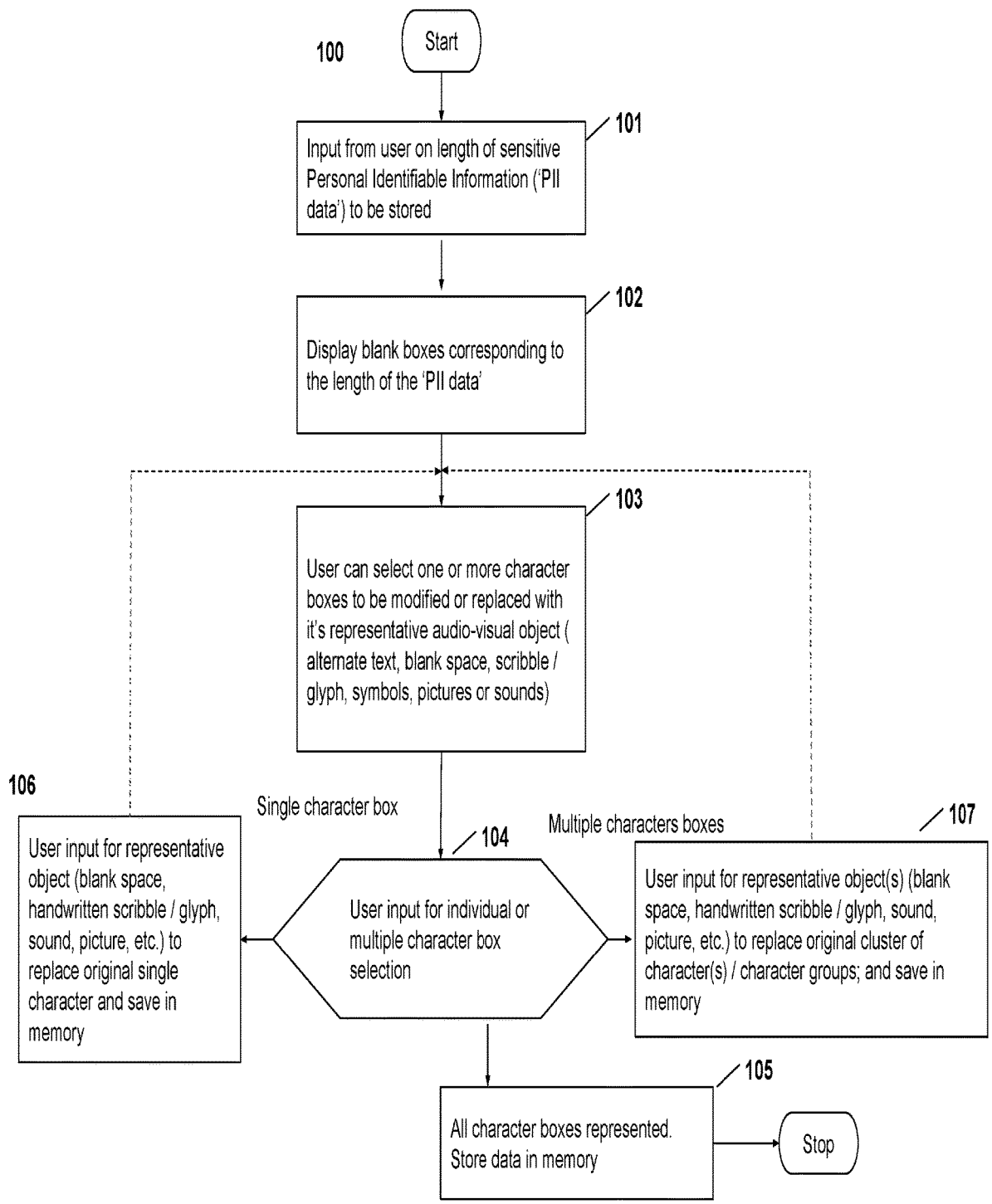

FIG. 4 shows the first example embodiment of a typical user use case where the PII data is saved as a simple combination of blank spaces and actual PII text.
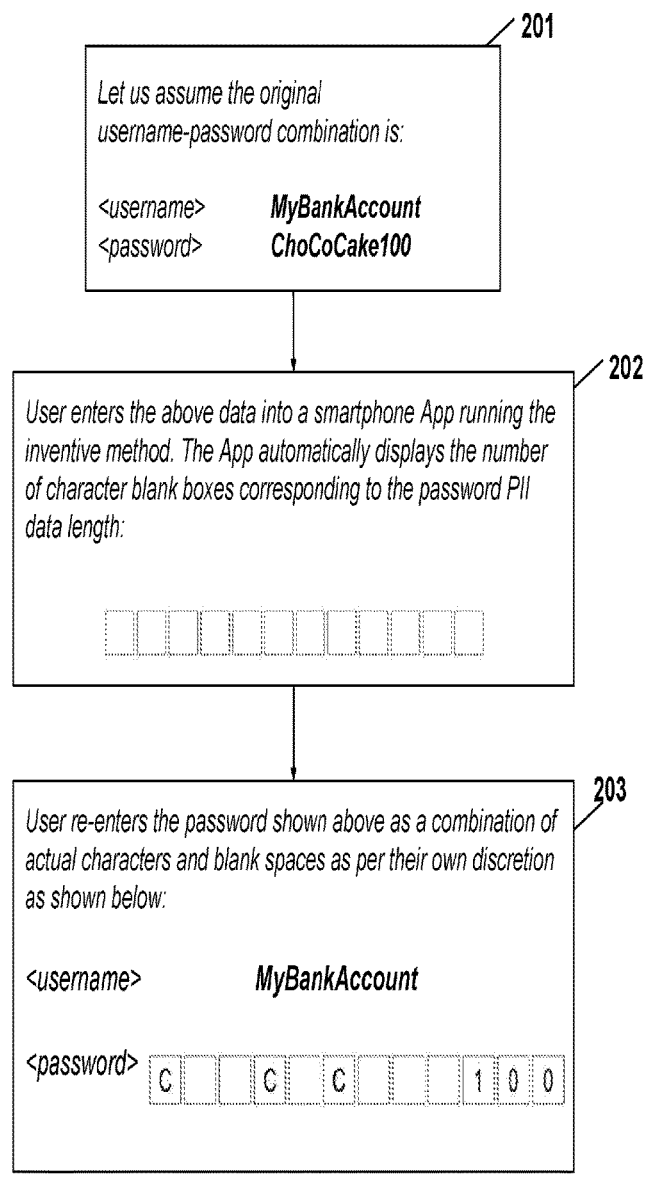

FIG. 5 shows an example embodiment of a typical user use case where the PII data is saved as a with a combination of user entered scribble or glyphs
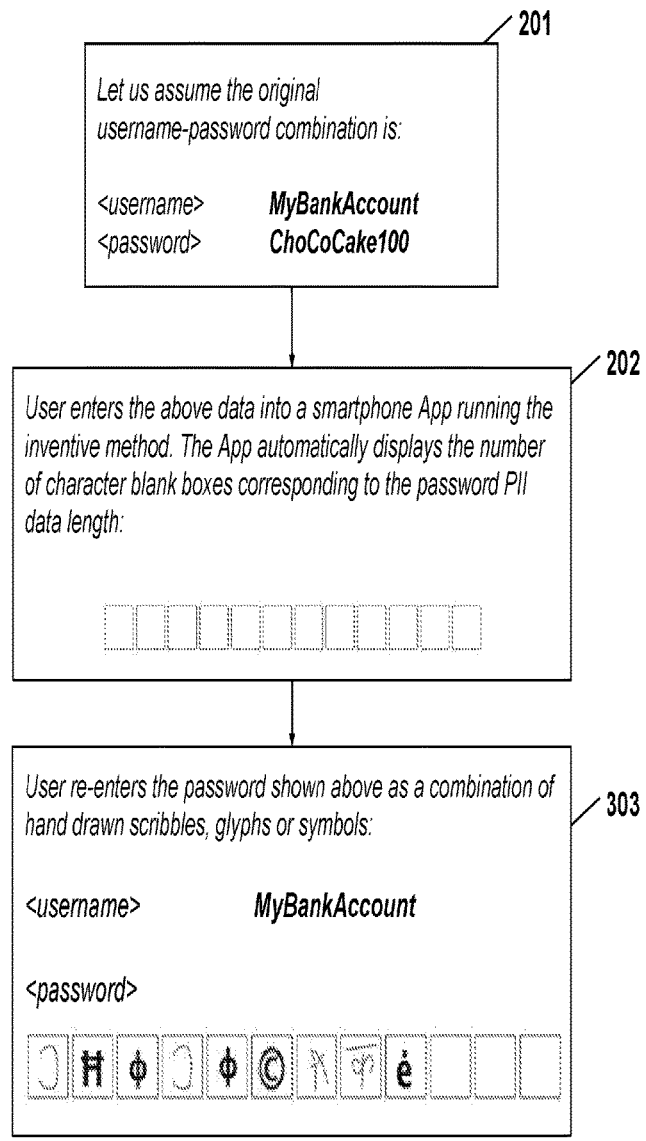

FIG. 6 shows an example embodiment of a typical user use case with a combination of user entered scribble graphics or pictures
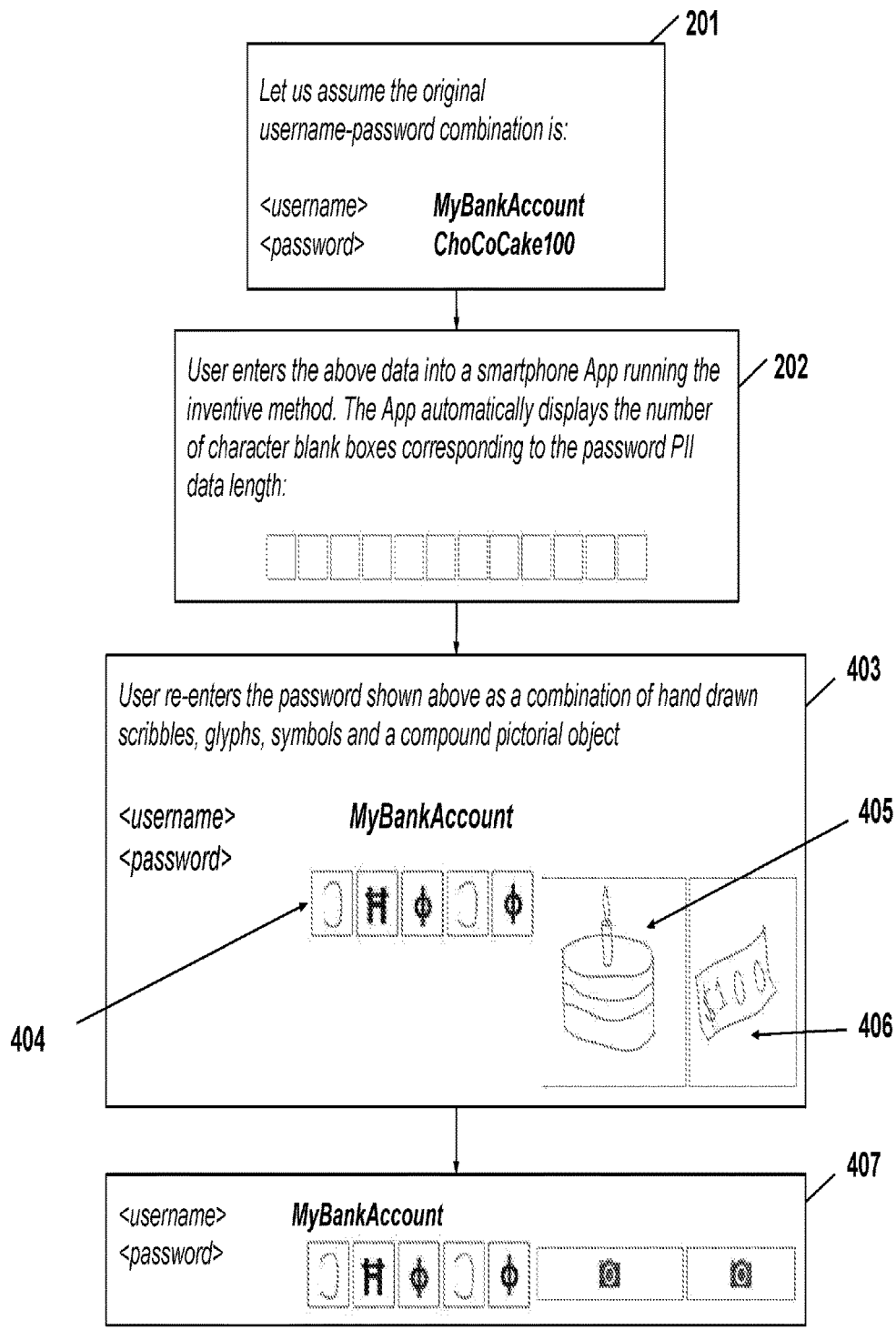

FIG. 7 shows various examples of possible embodiments of use case examples that do not necessarily represent a mutually exhaustive set of all possible combinations or embodiments

501

Actual PII data example (Social Security Number):          XXX-XX-XXXX
PII Data saved or recorded as:

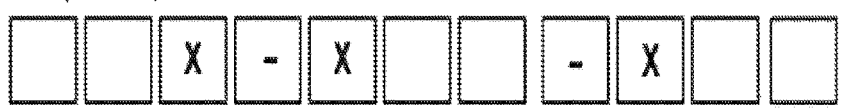

502

Actual PII data example (Credit Card Number:   10000023456   /   CVV code: 789)
PII Data saved or recorded as:

503

Actual PII data example          (Password: SolarWind-37 )
PII Data saved or recorded as:

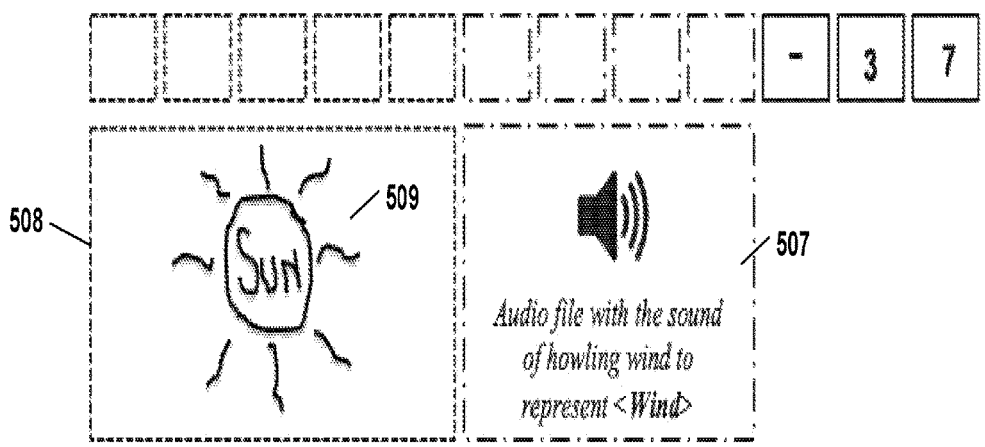

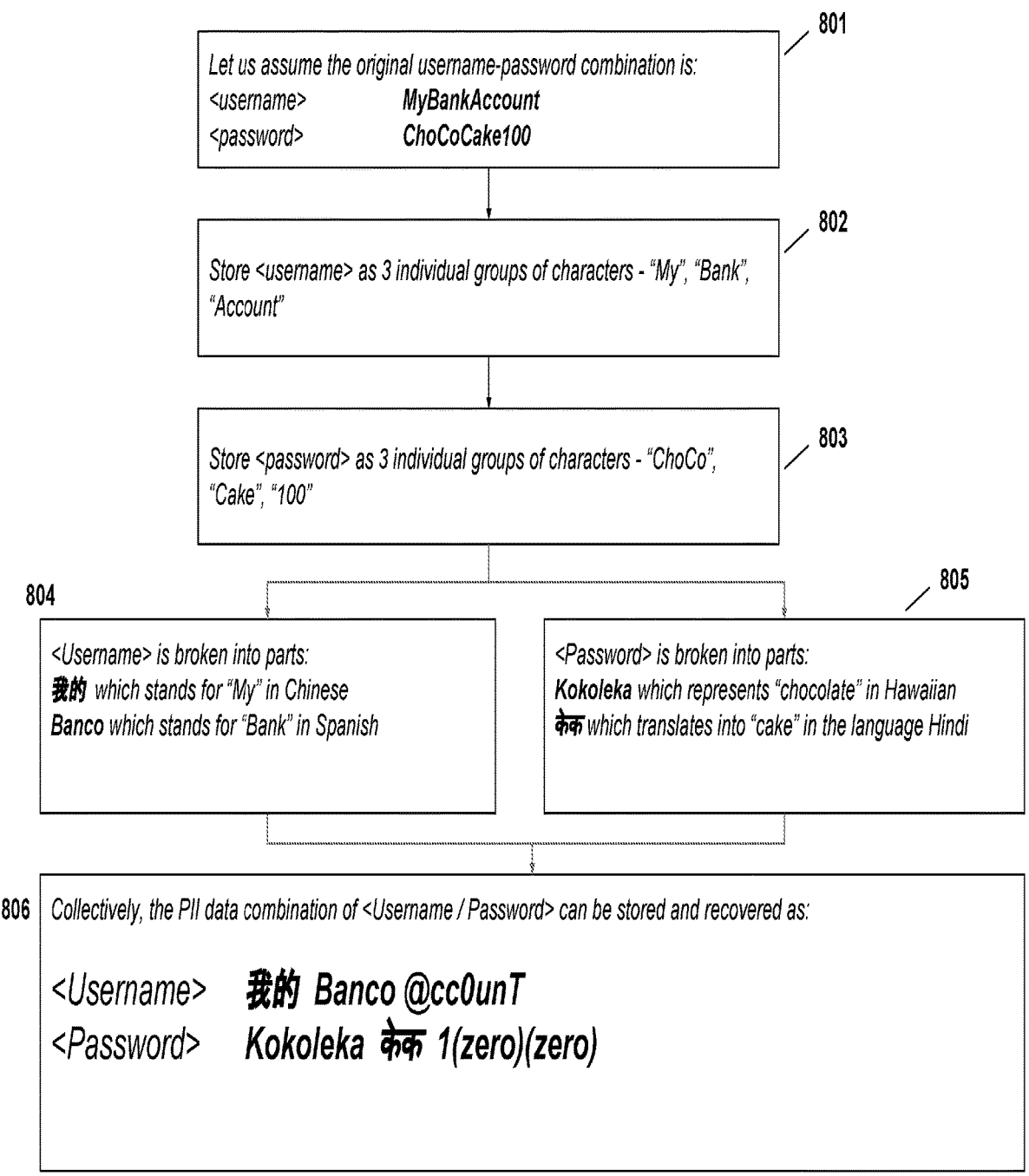

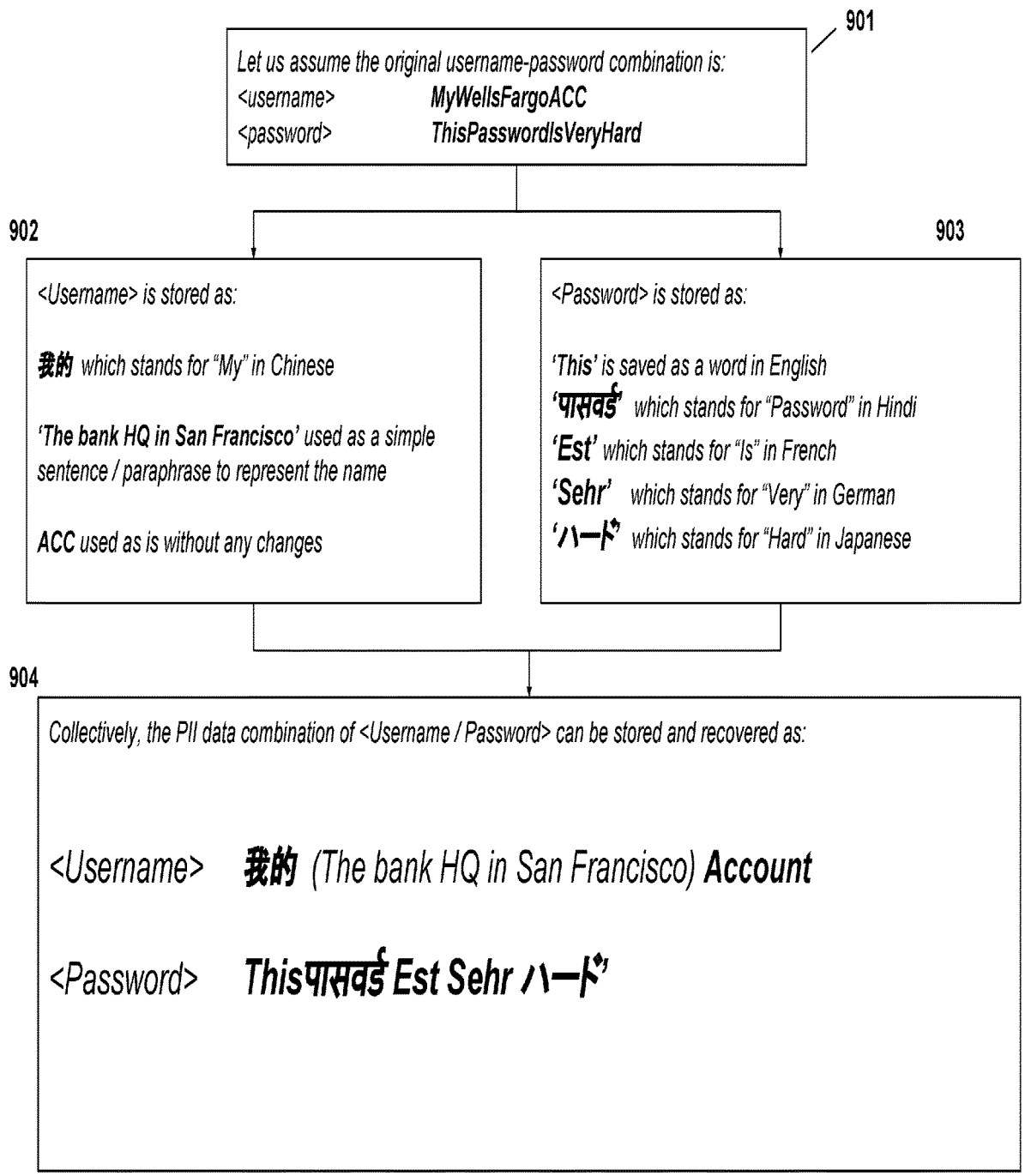

FIG. 10 shows an embodiment of an example use case showing a user's saved PII data through this inventive method
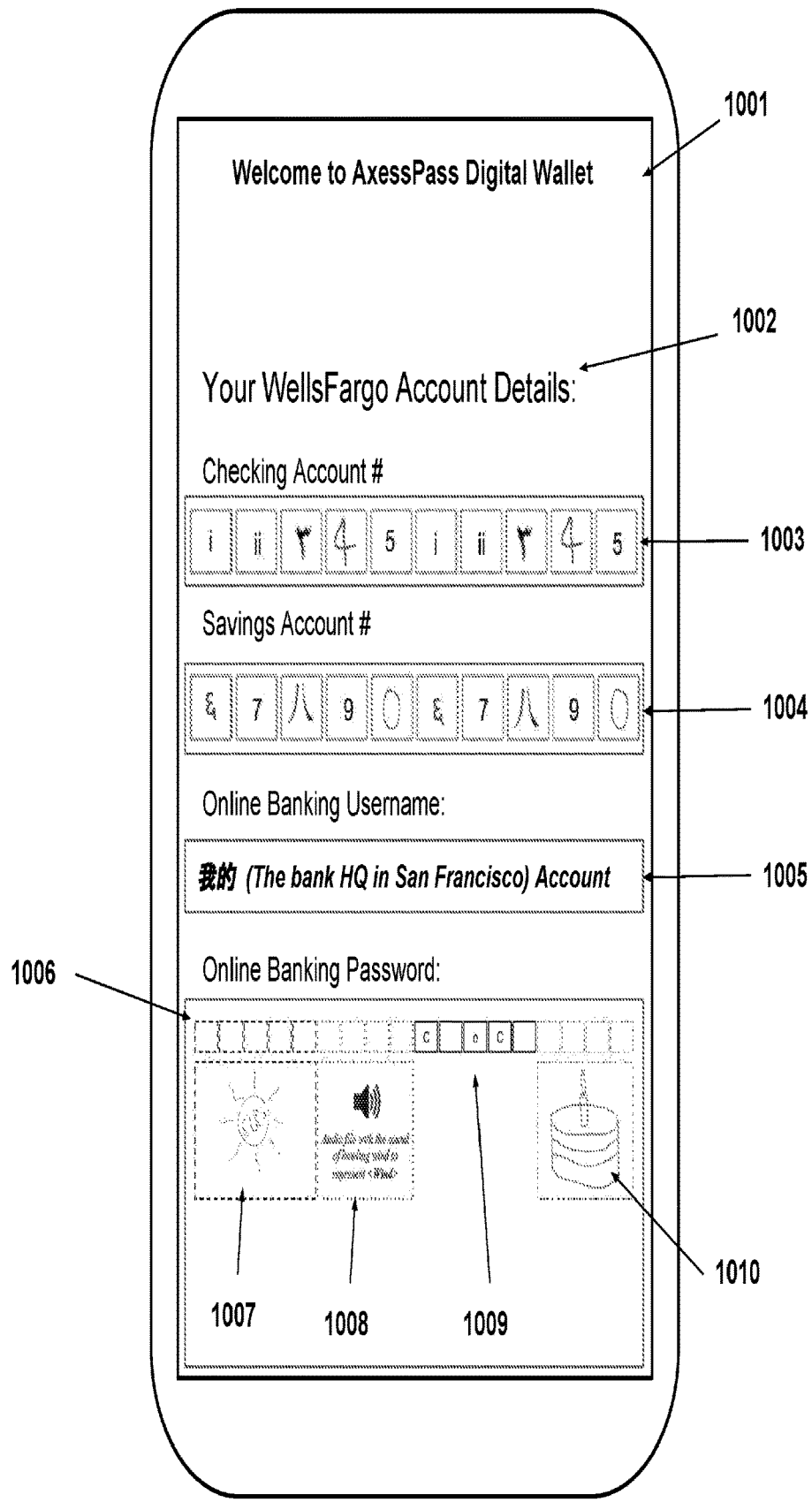

METHOD FOR SAVING, SENDING AND RECOLLECTION OF CONFIDENTIAL USER DATA

RELATED U.S. APPLICATION DATA

This application is a Continuation of co-pending application Ser. No. 15/427,051 filed on Feb. 8, 2017 and which claims the benefit of priority to Provisional Application No. 62/292,362, filed on Feb. 8, 2016. The entire contents of each of the above-identified applications are hereby incorporated by reference.

FIELD OF THE INVENTION

The field of the invention relates to storage, recollection or transfer of any Personal Identifiable Information (P.I.I) or confidential user specific data, that can be accessed using any human interface electronic devices.

BACKGROUND OF THE INVENTION

In today's digital age, the availability of confidential Personal Identifiable Information (PII) (any data that could potentially identify a specific person or individual), such as usernames, passwords, Social Security Numbers (SSN), Passport or Driver's license numbers, bank account/routing numbers (collectively referred to as "PII data"); or generic user specific data such as building access codes, phone numbers and addresses, need to be saved and remembered for regular day-to-day use. The ubiquitous use of such data presents a challenge where such data needs to be remembered, recorded or stored safely for personal use. This poses a potential problem, where, if such data is saved and stored electronically, is typically prone to malicious attacks and cyber leaks and can significantly compromise a user's identity or lead to identity theft.

In addition, the evolution of most software products from downloadable or multimedia disk storage based products to internet or cloud based products has lead to the need for multiple user access credentials such as login names and passwords. Virtually every business running today, ranging from health-care, banking, utilities, apparel, entertainment, travel, e-commerce, entertainment, etc., provides its users or consumers with some form of Internet or cloud based login portal. This requires a consumer to create their own individual user profile(s) and store important information related to their individual accounts. These types of e-commerce portals, websites or dedicated applications (or "Apps") most often require a user to create a unique login name and password combination to access them. For example, a user may have a health-care, banking or travel profile account (e.g., health insurance App, WELLS FARGO App, South-West Airlines App, etc.) that is accessible using a unique username/password combination. With many such portals, websites and apps that relate to a wide range of businesses, frequently the login username and password requirements (such as the combination of type of characters, special characters and numbers that can be used) are varying and are based on the login credential requirements set by the portal creator or administrator. This creates an inconvenience where users have to often remember various (multiple) different user logins/password combinations to access each of their different accounts.

The second challenge presents itself due to need to frequently recollect the abovementioned PII data. To address these hurdles, users often use different methods such as keeping multiple small variations of the their primary or master password, hand-written notes in their personal diary or photographs and copies of their credit cards, SSN numbers, banking account numbers etc. Alternatively, there are tools, utilities, products or specific smartphone applications ("Apps") [1][2][3][4] that act as data vaults and allow a user to store all their data in one single place or on the cloud where their data is protected by security measures such as a single master or primary password, sophisticated encryption algorithms and other fail safe methods designed to prevent unauthorized users from gaining access to the user data [3][4]. However, all these approaches require the user to provide their entire or complete PII data or username/password combination(s). There are other authentication methods that involve the use of "passdoodles" [5], "doodling" [6] or "scribbles" [7] for saving passwords or for the use of graphical passwords. However, these methods are primarily authentication techniques based on the similarity or comparison of the stored picto-graphical data with the user's real time inputs. This fundamentally still requires the need for the user's original PII data to be recorded or saved, in order to authenticate.

The above techniques present a security risk where in-spite of all the advances in encryption and security, a data breach could potentially result in the compromise of all user personal data that could be used in a malicious way. This particular inventive method aims to solve these challenges by using audio-visual cues, human memory cognition and anchoring to simply help the user remember their original PII data, as opposed to requiring a user to input and save it "as-is". This would make it significantly harder for malicious attacks and the possibility of breach of sensitive data by offering an alternate solution to help remember confidential PII data using a unique combination of pictures, text, sounds, scribbles, or glyphs to overcome the drawbacks in the prior art.

SUMMARY OF THE INVENTION

The present disclosure provides a new inventive method for allowing users to remember or recollect their confidential Personal Identifiable Information (PII data)—such as username(s)/password(s), Identity details (SSN, Passport, Driver's License Details), Financial information (bank account numbers, pin numbers), Health (Insurance details, hospital record login), etc., by storing this information (partially or wholly) as a combination of audio-visual cues—blank spaces, scribbles/glyphs/doodles, photographs or drawings, voice or sound snippets, symbols or languages, etc. Recovery of the saved PII data is achieved by the ease of recollection of the original data through human memory cues and association, also known as 'anchoring'. This removes the need to store the entire or exact confidential information (Usernames, passwords, account numbers, SSN, etc.) 'as-is' and significantly lowers the possibility of unwanted and malicious access to sensitive PII data that could pose a significant security and fraud risk. Human memory cues and association refers to the anchoring of a particular object or event to another object or event such that the recollection of one automatically makes it easy for the recollection of the other. A generic example of this can be the recollection of an important event such as one's birthday to the exact activities done on that day—i.e. on the 30th milestone birthday had dinner at a particular Sushi restaurant and remember the exact dish ordered too. In this case, the particular Sushi restaurant can be anchored or associated with something that can be easily recollected such as a milestone birthday. This inventive method makes use of the abovementioned memory association or anchoring to aid in the recovery of stored confidential Personal Identifiable Information (PII data) using the combination of various audio-visual objects such as text cues (individual characters, words, phrases, different language scripts), visual objects (hand drawn symbols, scribbles, pictures, photos), audio cues (sounds, recorded phrases) or a unique combination of the above. Since these audio-visual cues are stored and recorded by the user using the inventive method, there is a unique anchor based association that is only known to the user in question and cannot be interpreted or recollected by a proxy.

In one example embodiment, numeric PII data such as bank account numbers or SSN details can be stored by replacing each number with a symbol or hand drawn number represented in multiple languages so as to create a cryptic number that is only known to the user saving it. Another example embodiment involves the use of storing an account password by breaking it up into various segments that are represented individually. As an illustrative example, a password SolarWindChocolateCake100 could be broken up into five distinct segments—Solar, Wind, Chocolate, Cake & 100. These segments could be stored individually as—a hand drawn scribble representing the Sun, an audio file playing the sound of wind blowing, a photo of a favorite chocolate candy, the word 'Cake' written in a different language and the number '100' stored as a hand drawn scribble representing a $100 bill. In another embodiment, the same password SolarWindChocolateCake100 could be recorded in different languages known to a particular user such as 'päikese-Viento-kokoleka-केक -100'. In alternate embodiments, as opposed to saving the actual confidential PII data, the user can save PII data hints as passphrases or complete sentences that may directly or indirectly relate to the actual data as highlighted by an example user password 'SolarWind-37' which is recorded in a passphrase saved as "The Sun went Surfing in 37 miles and hour wind". In this particular example, though the sentence shown would probably not make much sense to the layman, it is certain to invoke a specific memory association or anchor in the mind of the user who recorded it and can aid in the recollection of the password it represents. There could be any number of variations of such a sentence or passphrase which are always unique to the user storing them. Other objects of the inventive method and advantages will become more apparent from the consideration of the following drawings and accompanying detailed description.

BRIEF DESCRIPTION OF THE DRAWINGS

Having described various embodiments of the inventive method in general terms, references will be made to the following drawings and figures, which are not necessarily drawn to scale, and wherein:

FIG. 1 shows an example embodiment of a smartphone App that may implement one or more methods of this disclosure.

FIG. 2 shows an example embodiment of one of the ways to edit and save PII data through a smartphone app.

FIG. 3 shows a flowchart process of the user interaction within the inventive method application.

FIG. 4 shows a flowchart of an example embodiment of a typical user use case with a combination of blank spaces and text.

FIG. 5 shows a flowchart of an example embodiment of a typical user use case with a combination of user entered scribble or glyphs.

FIG. 6 shows a flowchart of an example embodiment of a typical user use case with a combination of user entered scribble graphics or pictures.

FIG. 7 shows various examples of possible embodiments of use case examples that do not necessarily represent a mutually exhaustive set of all possible combinations or embodiments.

FIG. 8 shows an example embodiment saving the PII data as a combination of letters in different languages.

FIG. 9 shows an example embodiment saving the PII data as a combination of sentence paraphrases.

FIG. 10 shows an embodiment of an example use case showing a user's saved PII data through this inventive method.

DETAILED DESCRIPTION AND BEST MODE OF IMPLEMENTATION

The attached drawings illustrate different examples by which the inventive method could be used or applied. Elements indicated by reference numbers in the attached drawings correspond to the elements represented by the same reference numbers in the following description. Though the following embodiment is shown on a modern day 'smart' computing device or smartphone that may implement one or more techniques of this disclosure, any other type of computing device including but not limited to—laptop or desktop computers, smart tablets, in-vehicle computers, portable video gaming devices, retail point-of-sale devices, video game consoles, appliances household and industrial, gaming (e.g. gambling) devices etc., may implement the techniques of this disclosure.

FIG. 1 shows an exemplary system for storage and recovery of PII data using the present invention as seen through one of the many embodiments. As described in detail below, a computing device 10 with any form of external data input through a presence sensitive surface that interacts with external objects such as a pen, stylus or human finger; an image recording tool such as a camera; a sound or voice recording tool such as a built-in or external microphone; can implement the method described in this inventive claim.

FIG. 2 shows an example embodiment of one of the ways to edit and save PII data through a smartphone app implementing this inventive method. As seen in FIG. 1. A user application 'App' running on a smartphone 10, can be used to edit or save original PII data (16, 17, 18) through an example interface shown in FIG. 2. consisting of a section 20 that displays existing or stored user entered sensitive Personal Identifiable Information (P.I.I.) data such as username and passwords, etc. Upon selection of a single entry in section 20, section 21 allows editing of selected entry with an option to erase or save in the App memory. Upon user selection of any character box(s) in section 21, various options below become available, for editing the selected character box(s), and are displayed in section 22. Section 22 gives the user various means to make edits and changes to the above-selected entry from section 21; using different character editing inputs such as text 25, blank spaces 26, pictures or photographs 27, user entered scribble/glyph entries 28, sounds or voice inputs 29, etc. Section 22 inputs are not exhaustive and could contain any additional number or combination of data manipulation techniques and could be arranged in any other manner.

FIG. 3 shows a flowchart process of the user interaction within the inventive method application to store and retrieve sensitive user information (PII data) in accordance with the techniques of this disclosure. In shown examples, computing device 10 (FIG. 1) may perform operation 100 (FIG. 3). After the computing device starts operation 100, the user is prompted for the kind of sensitive user data that would like to be saved and stored—this could include, but be not limited to, usernames and passwords, bank account/routing numbers, credit card details, Social Security/Passport/Driver's license numbers, names/addresses or other details pertaining to the user, etc. The app prompts the user for the length of the user data to be stored (101) and correspondingly an equal number of empty character boxes 30 (FIG. 2) are displayed (102). The user is allowed to select (103) either individual single (106) or multiple character boxes (107), in 30, to be replaced and represented by various other representative audio-visual objects such as text 25, blank spaces 26, pictures or photographs 27, user entered scribble/glyph entries 28, sounds or voice inputs 29 (FIG. 2). This process continues until all the characters have been represented and stored or per user discretion (104, 105). Now let us look at various embodiments and ways the above can be implemented specifically.

FIG. 4 shows the first example embodiment of a typical user use case where the PII data is saved as a simple combination of blank spaces and actual PII text. This approach allows a user to recollect and remember important Personal Identifiable Information (PII) data that is commonly used (e.g. SSN details, passwords, usernames, bank accounts, etc.) by the use of associative memory cues, where it is much easier to recollect the entire phrase if the user is shown the key characters and not the entire phrase. As an example, one could easily recollect the word "Super-Bowl" if shown as "S_ _ _ r-B_ _ l"; the word "California" being shown as "C_li_ _ r_ _ a"; or perhaps a phone number "1-800-1234567" being shown as "_800 1 _ _ 4 _ _ 7". In the first of various possible embodiments, as illustrated in FIG. 4, an example operation is shown where a user wants to save a particular username/password combination (201); consisting of username MyBankAccount and it's respective example password ChoCoCake100, as text and blank spaces. The password length is judged by either user prompt 101 (or automatically once entered) and the app displays an equal number of character boxes (102) (202) representative of the actual number of characters in the password phrase. The user individually selects each character(s) of the passphrase to be 'hidden' by representing it (103) as a blank space as shown by the illustrative example (202, 203). The stored data can be later retrieved using the user's associate memory by merely looking at the partially saved data or hint (203).

FIG. 5. shows an alternate possible embodiment, where the same PII data is now stored as a combination of user entered scribble, glyph characters or symbols. Assuming the same PII data combination (201) consisting of username MyBankAccount and it's respective example password ChoCoCake100, the user can save characters as a combination of greek alphabets or custom hand drawn scribbles (including those drawn in different language scripts or any other types of symbols). This offers significant protection since only a particular user will know the true representation of the actual character/alphabet which is being replaced with it's respective glyph, scribble or symbol. For example, in this case (303), the letters in the passphrase "C and 0" are being replaced as a hand drawn mirror image of the letter "C" and "0" is represented as the greek symbol "Phi" respectively; the letter "K" represented in a different language script. This allows a user to virtually use any symbol, language or script and come up with any number of different combinations that are native to the user's discretion.

FIG. 6. shows an alternate possible embodiment, where the same PII data (201) is now stored as a combination of user entered scribbles, symbols and a set of individual characters being grouped together to be saved as a collective representative compound object picture. This lets a user decide which sub-group of letters/characters to be grouped together to be saved as it's representative. In our illustrative example, the password ChoCoCake100 is recorded by splitting it into three parts—ChoCo, Cake and 100. These disparate character groups (403) now can be saved as (i) combination of glyphs, scribbles and characters (404) (ii) a hand drawn image/glyph or picture of a cake (405) (iii) an image or picture representing the number 100 (such as a $100 dollar bill in our example image) (406). Further, the method allows a user to either hide or show the entire hints (407) (15).

FIG. 7 shows various additional possible embodiments of use case examples that do not necessarily represent a mutually exhaustive set of all possible combinations or embodiments. There are many possible combinations of ways a user can save/represent the actual character or a set of characters, in the data to be remembered, including but not limited to the use of blank spaces, scribbles or glyphs, characters in different languages or phonetics, pictures and images, voice grabs or sounds, etc. The example in (501) shows how a typical Social Security Number (SSN) in it's standard format of "XXX-XX-XXXX" can be saved as "_ _ X-X_ _-X_ _". The example in (502) shows a Credit Card number along with it's CVV security code being stored and saved intelligently in a particular sequence, only known to the user who saved it. The example in (503) shows a password being split into 3 sub-groups of characters and being saved/stored as a scribble/glyph object, a voice memo and the actual characters. These combinations are only known to the user who saved or entered the actual and representative data, thereby making it significantly harder for others to know the actual link or association of the objects with the character groups.

In some embodiments, PII data can be saved where each character or phrase is saved in a different language script that is known to the user. As illustrated in the process flowchart shown in FIG. 7, assuming the same PII data combination (801) consisting of username MyBankAccount and it's respective example password ChoCoCake100, the user can break the username into words (802)—My, Bank, Account and the password into three distinct character groups (803)—ChoCo, Cake and 100. In this example (804), the username is now stored as 我的 Banco @cc0unt, where "我的" stands for "My" in Chinese while "Banco" represents Bank in Spanish. Similarly as seen in (805), the word group ChoCo is now saved as kokoleka which means 'chocolate' in Hawaiian and "केक" which means "cake" in Hindi. Collectively, the username and password combination of MyBankAccount and ChoCoCake100 could now be stored as "我的 Banco @cc0unT" and "Kokoleka केक 1(zero)(zero)" respectively. This ensures that the user who saved and stored the above data only knows or can derive the original PII data that it represents.

In alternate embodiments, the same PII data can now be saved in multiple language scripts but as a combination of sentence paraphrases as illustrated in FIG. 9. Assuming the banking PII data combination (901) consisting of username MyWellsFargoACC and it's respective example password ThisPasswordIsVeryHard, the username is now stored by breaking it up into three distinct parts—My, WellsFargo & ACC. The hints now are saved as 我的 (The bank HQ in San Francisco) Account, where "我的" stands for "My" in Chinese while "(The bank HQ in San Francisco)" is now a sentence paraphrase that serves as a sentence hint for "WellsFargo". Similarly, the password is broken up into multiple fragments—'This', 'Password', 'Is', 'Very' & 'Hard' and saved as a collection of hints in various language scripts as This पासवर्ड Est Sehr ハード. This specific password hint is made up of—'This' is saved as a word in English, पासवर्ड which stands for "Password" in Hindi, 'Est' which stands for "Is" in French, 'Sehr' which stands for "Very" in German, ハード which stands for "Hard" in Japanese. This embodiment highlights the various ways different language scripts can be used to represent confidential data thereby making it significantly harder to decipher it even in case of a security breach since only the individual user responsible for saving it shall know the underlying meaning and significance of the PII data hints.

In another embodiment, this inventive method can use a combination of all of the above embodiments to collectively store and represent any PII data (usernames, passwords, banking accounts, etc.) using various audio-visual objects including (but not limited to) blank spaces, scribbles & glyphs, symbols, various language scripts, hand drawn scribble sketches, pictures, audio clips or sound files, etc. This is further illustrated in FIG. 10 by an example Digital Wallet application 'App' running on a smartphone 1001. A user's banking information is saved through this 'App' and uses the abovementioned inventive method in an illustrative embodiment 1002. The user's bank checking account number 1234512345 and savings account number 6789067890 examples are represented as symbols, hand drawn characters and actual numbers (1003)(1004). The online banking username is saved as a combination of language scripts and sentence passphrase hints (1005). The example online banking password (1006) "SolarWindChoCoCAKE" is broken up into 4 parts to be saved—'Solar', 'Wind', 'ChoCo' & 'CAKE' respectively. This inventive method stores each group of characters in various formats—Solar is represented as a hand drawn sketch of the Sun (1007), Wind is represented as an audio or sound file with a saved recording of the howling wind (1008), ChoCo is represented as a combination of blank spaces and english language characters as-is (1009) and CAKE is represented as a hand drawn sketch resembling a birthday cake (1010).

Although the inventive method has been described with reference to a particular arrangement and combination of a particular use of the described objects, features and the like, these are not intended to exhaust all possible combinations, arrangements or features, and many modifications and variations will be ascertainable to those of skill in the art.

CONCLUSION

A method for saving and recollecting Personal Identifiable Information (PII data) using audio-visual cues by the use of various discrete objects such as text, blank spaces, pictures or drawings, hand drawn scribbles, glyphs, symbols, audio files or voice snippets, characters, words or phrases in different language scripts, etc. The system and method involves using the abovementioned cues to create distinct representations of the saved PII data in different forms or through the use of puzzles and data hints. The method has the potential benefit of high memorability and data recollection for the specific user using it. The subject matter described herein involves language specific to the particular features of the described system, however, it is understood that the subject matter and specific features and acts are disclosed as exemplary forms of implementing the claims. The potential claims and benefits listed and discussed herein are not to be construed as a restriction of scope of the appended claims.

REFERENCES

[1] B. L. Lurey and D. S. Guccione, "Method and Apparatus for Protecting Account Numbers and Passwords" (U.S. Pat. No. 8,656,504 B2)
[2] Xu et al., "Sketch-Based Password Authentication", (U.S. Pat. No. 8,024,775 B2)
[3] Wesley W. Whitmyer, Jr., "Portable Password Keeper with Internet Storage and Restore" (Patent No: U.S. Pat. No. 8,914,855 B2)
[4] Hans Reisgies, "System for Storing One or More Passwords In a Secure Element" (US Patent No: US 2012/0159612 A1)
[5] Christopher Varenhorst, "Passdoodles; A Lightweight Authentication Method", 2004, Research Science Institute
[6] Goldberg et al., "Doodling Our Way to Better Authentication", April 2002, CHI, pp. 868-869
[7] Oka et al., "Scribble-a-Secret: Similarity-Based Password Authentication Using Sketches", 2008, IEEE, pp. 1-4.

I claim:
1. A method comprising:
receiving original confidential or sensitive user personal identifiable information data;
displaying a total or available number of empty character boxes or spaces, wherein
said total or available number of empty character boxes or spaces equals to the length of said original confidential or sensitive user personal identifiable information data, and
said total or available number of empty character boxes or spaces equals to a value of A;
receiving data representing a first number of empty character boxes or spaces selected to correspond to a first cluster of empty character boxes or spaces, wherein
said first number of empty character boxes or spaces equal to a value of B,
the value of B is less than the value of A,
said first cluster of empty character boxes or spaces corresponding to a first cluster of alpha-numeric characters from the original confidential or sensitive user personal identifiable information data,
allocating a second number of empty character boxes or spaces corresponding to a second cluster of empty character boxes or spaces,
said second cluster of empty character boxes or spaces corresponding to a second cluster of alpha-numeric characters from the original confidential or sensitive user personal identifiable information data,
said second number of empty character boxes or spaces equal to a value of C,
the value of C is less than the value of A,
the first cluster of empty character boxes or spaces includes at least one empty character box or space not included in said second cluster of empty character boxes or spaces; and replacing at least one of said first cluster of empty character boxes or spaces or said second cluster of empty character boxes or spaces with a human recognizable and human readable visual cue such as a hand drawn scribble, hand drawn drawing, doodle or glyph.

2. The method according to claim 1, wherein said method is performed by one or more processors reading and executing instructions that are stored on a non-transitory computer-readable medium.

3. The method according to claim 1, wherein
said confidential or sensitive user personal identifiable information data is a password.

4. The method according to claim 1, wherein
said original confidential or sensitive user personal identifiable information data is replaced to create specific original data hints for each unique alpha-numeric character cluster.

5. A method comprising:
receiving original confidential or sensitive user personal identifiable information data, wherein said original confidential or sensitive user personal identifiable information data is received in a first language;
displaying a total or available number of empty character boxes or spaces, wherein
said total or available number of empty character boxes or spaces equals to the length of said original confidential or sensitive user personal identifiable information data, and
said total or available number of empty character boxes or spaces equals to a value of A;
receiving data representing a first number of empty character boxes or spaces selected to correspond to a first cluster of empty character boxes or spaces, wherein
said first number of empty character boxes or spaces equal to a value of B,
the value of B is less than the value of A,
said first cluster of empty character boxes or spaces corresponding to a first cluster of alpha-numeric characters from the original confidential or sensitive user personal identifiable information data,
allocating a second number of empty character boxes or spaces corresponding to a second cluster of empty character boxes or spaces,
said second cluster of empty character boxes or spaces corresponding to a second cluster of alpha-numeric characters from the original confidential or sensitive user personal identifiable information data,
said second number of empty character boxes or spaces equal to a value of C,
the value of C is less than the value of A,
the first cluster of empty character boxes or spaces includes at least one empty character box or space not included in said second cluster of empty character boxes or spaces; and
replacing at least one of said first cluster of empty character boxes or spaces or said second cluster of empty character boxes or spaces with text in a second language or script, wherein the first language is a different language than the second language.

6. The method according to claim 5, wherein said method is performed by one or more processors reading and executing instructions that are stored on a non-transitory computer-readable medium.

7. The method according to claim 5, wherein
said original confidential or sensitive user personal identifiable information data is replaced to create specific original data hints for each unique alpha-numeric character cluster.

8. A method comprising:
receiving original confidential or sensitive user personal identifiable information data;
displaying a total or available number of empty character boxes or spaces, wherein
said total or available number of empty character boxes or spaces equals to the length of said original confidential or sensitive user personal identifiable information data, and
said total or available number of empty character boxes or spaces equals to a value of A;
receiving data representing a first number of empty character boxes or spaces selected to correspond to a first cluster of empty character boxes or spaces, wherein
said first number of empty character boxes or spaces equal to a value of B,
the value of B is less than the value of A,
said first cluster of empty character boxes or spaces corresponding to a first cluster of alpha-numeric characters from the original confidential or sensitive user personal identifiable information data,
allocating a second number of empty character boxes or spaces corresponding to a second cluster of empty character boxes or spaces,
said second cluster of empty character boxes or spaces corresponding to a second cluster of alpha-numeric characters from the original confidential or sensitive user personal identifiable information data,
said second number of empty character boxes or spaces equal to a value of C,
the value of C is less than the value of A,
the first cluster of empty character boxes or spaces includes at least one empty character box or space not included in said second cluster of empty character boxes or spaces; and
replacing at least one of said first cluster of empty character boxes or spaces or said second cluster of empty character boxes or spaces with a photograph or a picture.

9. The method according to claim 8, wherein said method is performed by one or more processors reading and executing instructions that are stored on a non-transitory computer-readable medium.

10. The method according to claim 8, wherein
said original confidential or sensitive user personal identifiable information data is replaced to create specific original data hints for each unique alpha-numeric character cluster.

11. A method comprising:
receiving original confidential or sensitive user personal identifiable information data;
displaying a total or available number of empty character boxes or spaces, wherein
said total or available number of empty character boxes or spaces equals to the length of said original confidential or sensitive user personal identifiable information data, and
said total or available number of empty character boxes or spaces equals to a value of A;
receiving data representing a first number of empty character boxes or spaces selected to correspond to a first cluster of empty character boxes or spaces, wherein said first number of empty character boxes or spaces equal to a value of B, the value of B is less than the value of A, said first cluster of empty character boxes or spaces corresponding to a first cluster of alpha-numeric characters from the original confidential or sensitive user personal identifiable information data, allocating a second number of empty character boxes or spaces corresponding to a second cluster of empty character boxes or spaces, said second cluster of empty character boxes or spaces corresponding to a second cluster of alpha-numeric characters from the original confidential or sensitive user personal identifiable information data, said second number of empty character boxes or spaces equal to a value of C, the value of C is less than the value of A, the first cluster of empty character boxes or spaces includes at least one empty character box or space not included in said second cluster of empty character boxes or spaces; and replacing at least one of said first cluster of empty character boxes or spaces or said second cluster of empty character boxes or spaces with an audio cue.

12. The method according to claim 11, wherein said method is performed by one or more processors reading and executing instructions that are stored on a non-transitory computer-readable medium.

13. The method according to claim 7, wherein said audio cue being either an audio clip, a voice file or a sound file.

14. The method according to claim 11, wherein said original confidential or sensitive user personal identifiable information data is replaced to create specific original data hints for each unique alpha-numeric character cluster.

15. An apparatus comprising:

at least one device configured and/or programmed to:

receive original confidential or sensitive user personal identifiable information data, wherein display a total or available number of empty character boxes or spaces, wherein said total or available number of empty character boxes or spaces equals to the length of said original confidential or sensitive user personal identifiable information data, and said total or available number of empty character boxes or spaces equals to a value of A;

receive data representing a first number of empty character boxes or spaces selected to correspond to a first cluster of empty character boxes or spaces, wherein said first number of empty character boxes or spaces equal to a value of B, the value of B is less than the value of A, said first cluster of empty character boxes or spaces corresponding to a first cluster of alpha-numeric characters from the original confidential or sensitive user personal identifiable information data, allocate a second number of empty character boxes or spaces corresponding to a second cluster of empty character boxes or spaces, said second cluster of empty character boxes or spaces corresponding to a second cluster of alpha-numeric characters from the original confidential or sensitive user personal identifiable information data, said second number of empty character boxes or spaces equal to a value of C, the value of C is less than the value of A, the first cluster of empty character boxes or spaces includes at least one empty character box or space not included in said second cluster of empty character boxes or spaces; and replace at least one of said first cluster of empty character boxes or spaces or said second cluster of empty character boxes or spaces with a human recognizable and human readable visual cue such as a hand drawn scribble, hand drawn drawing, doodle or glyph.

\* \* \* \* \*